United States Patent
Sardo et al.

(10) Patent No.: US 11,330,825 B2
(45) Date of Patent: May 17, 2022

(54) METHOD OF TREATMENT USING A BIOCIDAL OR PHYTOPROTECTIVE PRODUCT, DEVICE AND CORRESPONDING TREATMENT ASSEMBLY

(71) Applicant: XEDA INTERNATIONAL S.A., Saint Andiol (FR)

(72) Inventors: Alberto Sardo, Chateaurenard (FR); Stefano Sardo, Chateaurenard (FR)

(73) Assignee: XEDA INTERNATIONAL S.A., Saint Andiol (FR)

( * ) Notice: Subject to any disclaimer, the term of this patent is extended or adjusted under 35 U.S.C. 154(b) by 195 days.

(21) Appl. No.: 16/312,260

(22) PCT Filed: Jun. 20, 2017

(86) PCT No.: PCT/EP2017/065138
§ 371 (c)(1),
(2) Date: Dec. 20, 2018

(87) PCT Pub. No.: WO2017/220612
PCT Pub. Date: Dec. 28, 2017

(65) Prior Publication Data
US 2019/0159469 A1 May 30, 2019

(30) Foreign Application Priority Data
Jun. 20, 2016 (FR) .................... 16 55731

(51) Int. Cl.
*A61L 2/00* (2006.01)
*A61L 9/00* (2006.01)
(Continued)

(52) U.S. Cl.
CPC ............ *A23B 7/144* (2013.01); *A23L 3/3409* (2013.01); *A23L 3/34095* (2013.01);
(Continued)

(58) Field of Classification Search
CPC .... A01N 2300/00; A01N 27/00; A01N 31/02; A01N 65/22; A01N 65/28; A23B 7/144;
(Continued)

(56) References Cited

U.S. PATENT DOCUMENTS

| 5,918,537 A | 7/1999 | Forsythe et al. |
| 6,375,999 B1 | 4/2002 | Forsythe et al. |

FOREIGN PATENT DOCUMENTS

| WO | 2014/001201 A1 | 1/2014 |
| WO | 2014/160274 A1 | 10/2014 |

OTHER PUBLICATIONS

Search Report of corresponding PCT Application No. PCT/EP2017-065138—3 pages (dated Aug. 31, 2017).
(Continued)

*Primary Examiner* — Monzer R Chorbaji
(74) *Attorney, Agent, or Firm* — Knobbe Martens Olson & Bear LLP

(57) ABSTRACT

A method of treatment with at least one biocidal and/or safener product with a boiling temperature between 60 and 280° C., wherein the method comprises a treatment step duration greater than or equal to 3 days, wherein the treatment step comprises at least one injection phase of a duration greater than or equal to 3 days during which a liquid containing the, or each, product is evaporated and injected inside an enclosure, wherein the liquid is evaporated and injected with a period of less than or equal to two days during the injection phase, wherein the liquid is evaporated at a temperature below 50° C.

15 Claims, 5 Drawing Sheets

(51) Int. Cl.
    *A23B 7/144*     (2006.01)
    *A23L 3/3409*     (2006.01)
    *B65D 81/28*     (2006.01)
    *A01N 27/00*     (2006.01)
    *A01N 31/02*     (2006.01)
    *A01N 65/22*     (2009.01)
    *A01N 65/28*     (2009.01)

(52) U.S. Cl.
    CPC .............. *B65D 81/28* (2013.01); *A01N 27/00* (2013.01); *A01N 31/02* (2013.01); *A01N 65/22* (2013.01); *A01N 65/28* (2013.01); *A01N 2300/00* (2013.01)

(58) Field of Classification Search
    CPC ... A23L 3/3409; A23L 3/34095; B65D 81/28; A61L 2/00; A61L 2/0094; A61L 2/20; A61L 2/22
    USPC .................................. 422/1, 28, 32; 426/302
    See application file for complete search history.

(56) References Cited

OTHER PUBLICATIONS

Search Report of corresponding FR Application No. 16 55731—3 pages (dated Nov. 15, 2016).

METHOD OF TREATMENT USING A BIOCIDAL OR PHYTOPROTECTIVE PRODUCT, DEVICE AND CORRESPONDING TREATMENT ASSEMBLY

FIELD

The invention generally relates to the vaporization of biocidal and or safener products.

More specifically, the invention relates, according to a first aspect, to a method of treatment with at least one biocidal and/or safener product.

BACKGROUND

It is known that certain volatile products of natural origin, for example essential oils, have interesting biocidal or safener properties. They are used, in particular, to treat vegetable products in order to improve their preservation.

The techniques used so far in the application of these products to plants are as follows:
- immersion of the vegetable products in a hot or cold aqueous dispersion containing the product;
- spraying of premises, for example storage chambers for vegetables, in order to sanitize them;
- micro-nebulization at the entrance of vegetable products into storage chambers.

The quantities of products applied are high and may lead to high concentrations in vegetable products.

SUMMARY

In this context, the invention aims to propose a treatment method that does not have this drawback.

To this end, the invention relates to a method of treatment with at least one biocide and/or safener product with a boiling temperature between 60 and 280° C., wherein the method comprises a treatment step of a duration greater than or equal to 3 days, wherein the treatment step may comprise at least one injection phase of a duration greater than or equal to 3 days, in the course of which a liquid containing the, or each, product is evaporated and injected inside an enclosure, wherein the enclosure is a room, and wherein the liquid is evaporated and injected with a period of less than or equal to two days during the injection phase, while the liquid is evaporated at a temperature below 50° C.

The idea underlying the invention is, therefore, to provide a treatment that is spread over a long period, as opposed to known treatments in which a large quantity of products is injected selectively over a very short period. This makes it possible to gradually inject the product in small quantities, so that the concentration of products inside the enclosure always remains at a moderate level.

In addition, the system self-regulates, wherein the product is vaporized at room temperature, lower than 50° C., wherein it evaporates until saturation of the atmosphere without risk of oversaturation (which is the case for heating). This prevents the liquid from recondensing after injection. Condensation of the liquid leads to the formation of droplets that can fall back on the stored food products, and be phytotoxic to them. On the contrary, cold evaporation allows excellent diffusion and excellent penetration into the mass of vegetable products stored inside the enclosure due to the absence of condensation in the form of droplets. This leads to product concentrations on vegetable products or on the inner walls of the enclosure, that are relatively constant and moderate.

In addition, the vapor molecules diffuse more easily than liquid droplets, especially in vegetable products stored in bulk or in large volume containers such as pallets or Big-Bags.

Furthermore, the treatment method may have one or more of the above characteristics, considered individually or in any technically feasible combination:
- the method may comprise a step of determining a quantity that is representative of a rate of removal of the, or each, product inside the enclosure, and a step of selecting conditions for evaporation and injection of the liquid as a function of the representative quantity;
- during the, or each, injection phase, the liquid is evaporated and injected under conditions chosen to maintain a concentration of the, or each, product in an internal atmosphere of the enclosure within a concentration range predetermined for each use, wherein this concentration is between 50 and 2000 ppm;
- at least one of the products is selected from the following list of safener products or the following list of biocidal products:
    - safener products: essential oil; terpenes; saturated or unsaturated C3-C9 short chain alcohol, such as isopropanol, iso-octanol, 2-ethylhexanol; volatile synthetic products, such as, for example, glutaraldehyde, hexanal, dimethylnaphthalene and 3-decene-2-one;
    - biocidal products: clove oil, thyme oil, geraniol, ethyl alcohol, glutaraldehyde;
- the method comprises a step of storing vegetable products in the enclosure for a storage period greater than or equal to 3 days, wherein at least one of the products is a safener product;
- the treatment duration is greater than or equal to 50% of the storage duration;
- the treatment step comprises a single injection phase of duration that is substantially equal to the duration of the treatment step;
- potatoes are stored in the enclosure, wherein the liquid comprises at least 50% by weight of L-carvone, and wherein between 1 and 10 ml of liquid per tonne of potatoes is injected each day during the injection phase;
- the treatment step comprises a plurality of successive injection phases separated from each other by stop phases without liquid injection; and
- the liquid is evaporated by contact with a flow of air in a packed tower;
- the internal atmosphere of the enclosure is kept saturated with product;
- the evaporation is carried out with a permanently operating vaporizer;
- an analyzer permanently measures the concentration of product in the internal atmosphere of the enclosure, wherein the evaporation is carried out by a vaporizer controlled as a function of the measured concentration in order to maintain the concentration of product within a predetermined range.

Alternatively, the method may comprise a step of determining a representative quantity of the rate of absorption of the, or each, product by the vegetable products, and a step of selecting the conditions for injecting the liquid as a function of the representative quantity determined.

According to a second aspect, the invention relates to a treatment device with at least one biocidal and/or safener product with a boiling temperature between 60 and 280° C., wherein the device comprises:

a vaporizer that is designed to evaporate a liquid containing the, or each, product at a temperature below 50° C., and to inject the vaporized liquid inside an enclosure;

an electronic device for controlling the vaporizer, and programmed to implement a treatment step of a duration longer than or equal to 3 days, wherein the treatment step comprises at least one injection phase of a duration greater than or equal to 3 days, during which period the vaporizer evaporates the liquid and injects the vaporized liquid with a period of less than two days.

The device may further represent one or more of the following features, considered individually or in any technically feasible combination:

the electronic device may be programmed so that, during the, or each, injection phase, the liquid is evaporated and injected under conditions chosen to maintain a concentration of the, or each, product in an internal atmosphere of the enclosure, within a concentration range predetermined for each use, the concentration in the atmosphere being comprised between 50 and 2000 ppm;

vegetable products are stored in the enclosure for a storage period greater than or equal to 3 days, wherein at least one of the products is a safener product, and wherein the electronic device is programmed so that the treatment duration is greater than or equal to 50% of the storage period;

the electronic device is programmed so that the treatment step comprises a single injection phase of a duration that is substantially equal to the duration of the treatment step;

the electronic device is so programmed that the treatment step comprises a plurality of successive injection phases separated from each other by stop phases without injection; and the vaporizer comprises a tower comprising a packing, a device for injecting the liquid above the packing, and a device arranged to create an ascending flow of air through the packing;

the electronic control device controls the vaporizer to maintain the internal atmosphere of the enclosure saturated with the product;

the electronic control device permanently operates the vaporizer;

the device comprises an analyzer continuously measuring the concentration of product vapor in the internal atmosphere of the enclosure, wherein the electronic control device controls the vaporizer as a function of the measured concentration in order to maintain the product concentration within a predetermined range.

According to a third aspect, the invention relates to a unit comprising an enclosure and a treatment device having the above characteristics, wherein the vaporizer is designed to inject the vaporized liquid into the enclosure, vegetable products being preferably stored in the enclosure.

BRIEF DESCRIPTION OF THE DRAWINGS

Other features and advantages of the invention will emerge from the detailed description given below that is for information only and is in no way limitative, with reference to the appended figures, wherein.

DETAILED DESCRIPTION

The invention therefore relates to a treatment method using at least one product, and which is either a disinfection treatment or a safener treatment.

Figure 1:
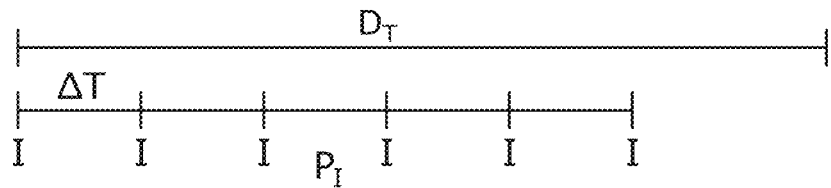
FIGS. 1 to 5 show timing diagrams illustrating various embodiments of the invention.

In all cases, as illustrated in FIG. 1, the method comprises a treatment step of duration DT that is greater than or equal to 3 days, preferably greater than or equal to 5 days, and still more preferably greater than or equal to 7 days.

The duration of the treatment step depends on the type of treatment.

First Type of Treatment, Short Duration.

For a disinfection treatment of premises or for safener treatment of wheat in silos, citrus fruits, stone fruits such as peaches, the duration DT of the treatment stage is typically between 3 days and 1 month. It depends on the application case, the nature of the contamination to be eliminated and the level of residual contamination targeted, the nature of the biocidal or safener product to be applied, the size of the enclosure, the temperature inside the enclosure, etc.

Second Type of Treatment, Long Duration

Figure 2:
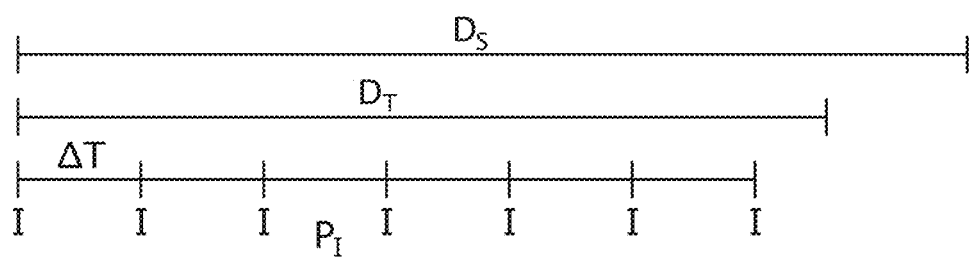
Figure 3:
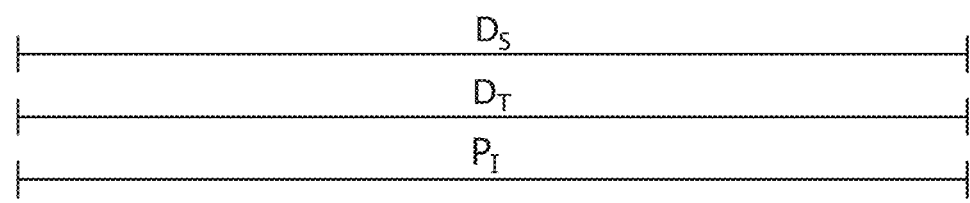
Figure 4:
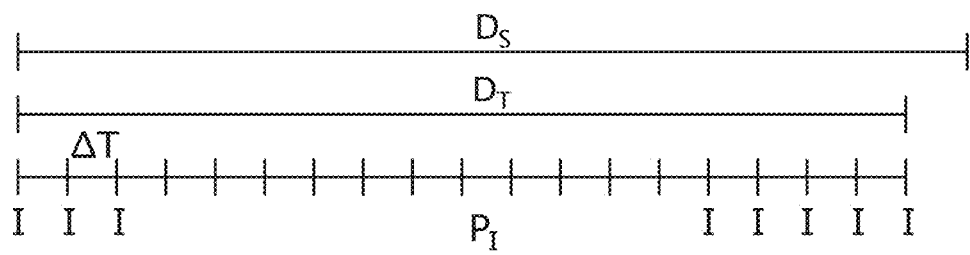

Long duration treatments are typically safener treatments. The treatment duration DT is a function of the storage time DS of the vegetable products inside the enclosure (FIGS. 2 to 4). The invention is particularly suitable for cases where the vegetable products are stored for a long time. The storage duration DS is typically between 3 months and 1 year.

The treatment duration DT is typically greater than or equal to 50% of the storage duration, preferably greater than 75%, more preferably greater than 90% of the storage duration DS.

The treatment duration DT is thus typically between 3 months and 1 year.

Thus, a treatment is carried out that extends practically over the entire storage period, guaranteeing excellent control of the development of the vegetable products.

The treatment step, as may be seen in FIG. 1, comprises at least one injection phase with a duration PI greater than or equal to 3 days, preferably greater than or equal to 5 days, still more preferably greater than or equal to 7 days. During the injection phase, a liquid containing the, or each, product is evaporated and injected inside an enclosure.

Figure 5:
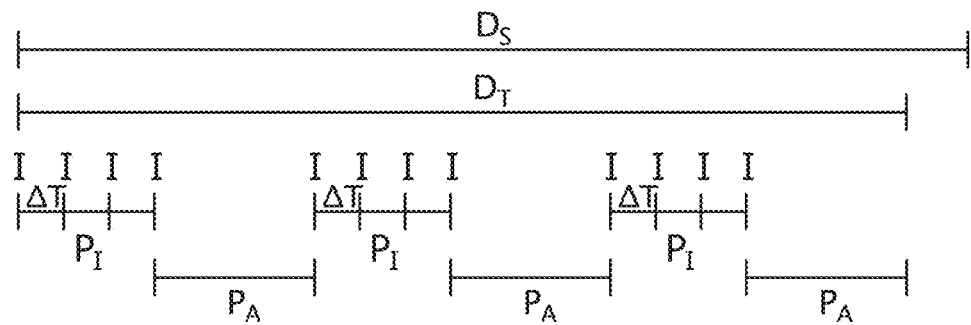

The treatment step comprises, for example, a single injection phase, as illustrated in FIGS. 1 to 4. Alternatively, the treatment step may comprise a plurality of injection phases separated from one another by stop phases without liquid injection, as shown in FIG. 5.

The duration of the injection phase is at least 3 days, preferably greater than or equal to 5 days, more preferably greater than or equal to 7 days. It is at most equal to the duration DT of the treatment step.

In the case of a single injection phase (FIGS. 1 to 4), the duration of the injection phase is substantially equal to the duration of the treatment step DT. Alternatively, the duration of the injection phase may be shorter than that of the treatment step, for example because the last injection operation was performed slightly before the end of the treatment step.

When the treatment step comprises a plurality of successive injection phases (FIG. 5), the duration of each injection phase is typically between 3 days and 15 days, preferably between 3 days and 10 days.

The duration of each stop phase is typically between 15 days and two months. For example, it may be chosen so that the cumulative duration of the injection phase and the next stop phase is one month.

As illustrated in FIG. 1, during the injection phase, the liquid is evaporated and injected with a period ΔT of less than 2 days. By this is meant that the injections I of evaporated liquid are separated by a period ΔT of 2 days maximum.

The evaporation and injection of the liquid may be, for example, continuous throughout the injection phase, wherein the period is, in this case, equal to 0 (FIG. 3).

Alternatively, the evaporation and the injection of the liquid may be fractionated, wherein the injection phase then comprises several separate evaporated liquid injection operations (FIG. 1, 2 4, 5) spaced apart from each other by the period ΔT. The period ΔT is the time between the start of two evaporated liquid injection operations. The evaporation and injection are interrupted between two injection operations. These injection operations are symbolized by an I in FIGS. 1, 2, 4 and 5.

The number of injection operations I during the injection phase is at least 2. Typically, there are between two injection operations per day and one operation every two days. For example, one injection operation is performed per day.

The duration of each injection operation is at least one hour and at most twenty-four hours. Typically, it is between 1 hour and 15 hours.

Typically, the injection operations are regularly spaced in time.

An enclosure here is understood to mean an enclosure having a relatively high level of tightness, so that the internal atmosphere of the enclosure does not communicate, or only slightly, with the atmosphere outside the enclosure. As explained below, it is important that the product(s) injected into the enclosure do(es) not escape into the external atmosphere, or escape at a reduced flow rate that is low enough not to penalize liquid and product consumption.

In the case of a disinfection treatment (FIG. 6), the enclosure may be, for example, a part of a hospital, a school, an industrial installation, or any other type of premises. The enclosure may also be a tank, a storage or transport tank, or any other type of enclosure to be disinfected. The enclosure may also be a chamber for storing vegetable products, but not containing any vegetable products.

Figure 7:
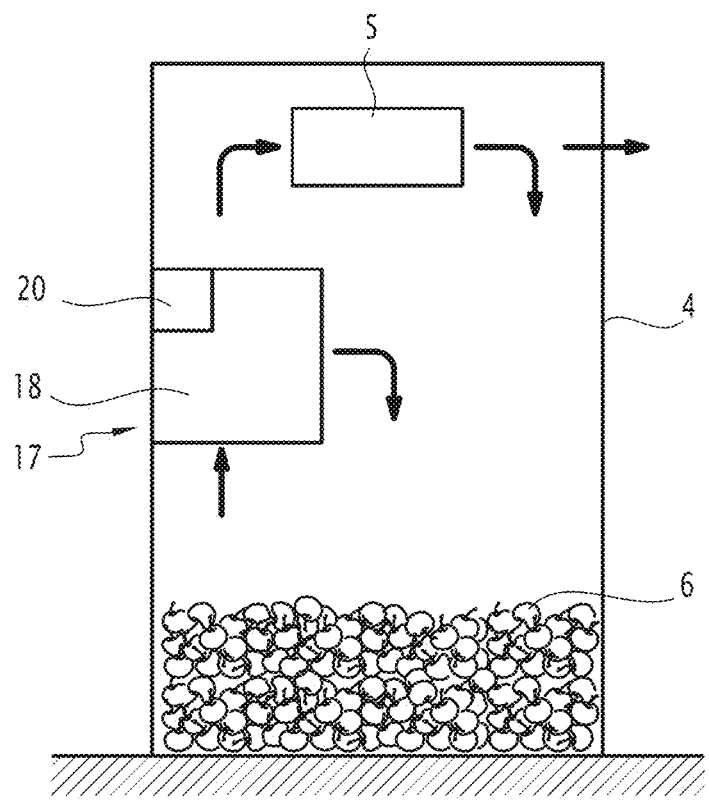
FIG. 7 shows a view similar to that of FIG. 6, in which the treatment device of the invention is mounted in a vegetable product storage chamber.

In the case of a safener treatment, the enclosure may be, for example, a chamber, a silo, a greenhouse or any room for the storage of vegetable products such as fruits or vegetables (FIG. 7). The treatment may be applied while the vegetable products are stored in the enclosure, or, on the contrary, while the enclosure is empty.

Figure 8:
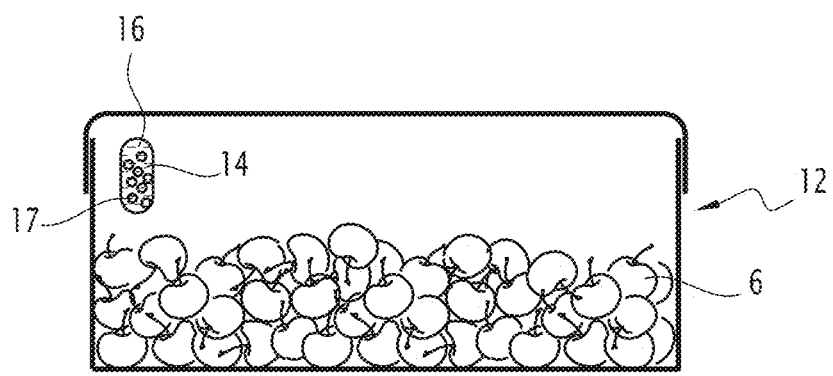
FIG. 8 shows a schematic view of a unit not according to the invention, wherein the enclosure is a package in which vegetable products are packaged.

According to a variant not covered by the invention, the enclosure may be a package in which are packaged vegetable products (FIG. 8).

The liquid may comprise a single product, or comprise several products in a mixture. The product may be a volatile product with a boiling point is between 60 and 280° C.

Each product is either a biocidal product, for disinfection applications, or a safener product, for the treatment of vegetable products.

The liquid may contain only biocidal products, or safener products, or comprise one or more biocidal products mixed with one or more safener products.

At least one of the safener products is chosen from the following list: essential oil, terpenes, saturated or unsaturated C3 to C9 alcohol, for example isopropanol, iso-octanol, 2-ethylhexanol, volatile synthetic products such as glutaraldehyde, hexanal, dimethylnaphthalene and 3-decene-2-one.

The essential oil may be, for example, selected from the group consisting of mint oil, clove oil, rose oil, thyme oil, oregano oil. Alternatively, the liquid may comprise one of the constituents of these oils, selected from the group consisting of L-carvone, eugenol, geraniol, thymol, carvacrol.

For a disinfection application, the biocidal product is a volatile product, natural or synthetic, having biocidal properties, such as clove oil, thyme oil, geraniol, ethyl alcohol, glutaraldehyde.

Typically, the liquid only comprises the product(s) without a solvent or adjuvant. Alternatively, the liquid may comprise an aqueous or organic solvent, in which is dissolved the product(s) and one or more adjuvants. The aqueous solvent may be, for example, water. The organic solvent may be, for example, a solvent of the type described in FR 2 791 910 or glycols, di-glycols and their relative esters. The adjuvants may be, for example, substances capable of transporting the active substance(s) or capable of producing a dilution effect.

In any event, the liquid is vaporized during the injection phase at a temperature below 50° C., preferably below 20° C., in particular between −2° C. and +12° C., and, in particular, between 0 and 10° C. For example, the liquid may be evaporated at room temperature.

According to an important aspect of the invention, during each injection phase PI, the liquid is evaporated and injected under conditions that are chosen in order to maintain a concentration of the, or each, product in an internal atmosphere of the enclosure comprised within a predetermined concentration range.

The concentration range depends on the intended application and the product. It is generally determined experimentally, as described below. For example, a total gradient of concentration in the atmosphere between 50 and 2000 ppm is targeted.

The term "evaporation and injection conditions" is understood to mean here one or more of the following parameters:
- duration of the treatment phase,
- number of injection phases;
- duration of each injection phase;
- duration of each stop phase without injection, if applicable;
- number of injection operations during each injection phase;
- duration of the period between two injection operations,
- quantity of product injected at each injection operation.

Advantageously, in order to determine the conditions of evaporation and liquid injection, the method comprises a step of determining a quantity that is representative of a rate of elimination of the, or each, product within the enclosure, and a step of selecting evaporation and liquid injection conditions according to the representative quantity.

In fact, the product injected inside the enclosure is consumed in different ways:
- a part is absorbed by vegetable products, in the case of a safener treatment;
- a part is deposited on the internal surfaces of the enclosure;
- a part is evacuated towards the outside of the enclosure, in the case where there are leaks causing a circulation of air from inside the enclosure towards the outside of the enclosure;
- a part is absorbed in the air treatment system of the enclosure, when it is equipped with such a system.

In fact, the air treatment systems may include activated carbon filters that trap a portion of the product from the internal atmosphere. Likewise, enclosures, especially storage chambers for vegetable products, are typically refrigerated. There is condensation at the heat exchangers cooling the internal atmosphere of the enclosure, wherein the product is partly dissolved in the condensed moisture.

It should be noted that the rate at which each product is absorbed by the vegetable products depends on the ambient temperature inside the enclosure.

The determination step makes it possible to determine the representative quantity of the elimination rate of the, or each, product taking into account all the above parameters.

Figure 9:
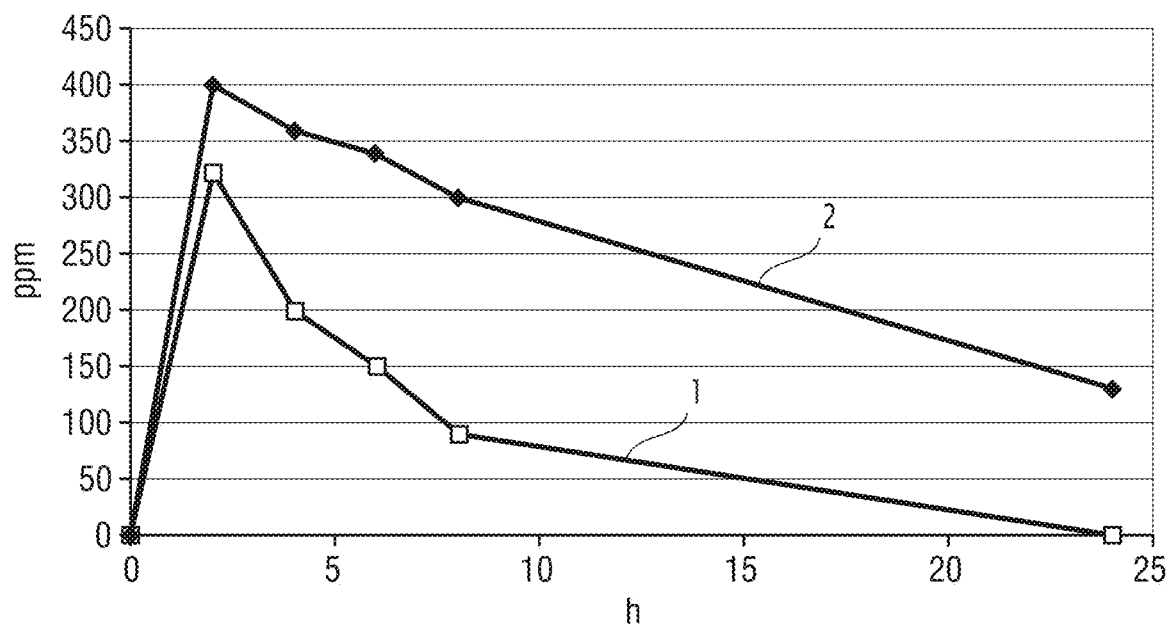
FIGS. 9 and 10 show graphs making it possible to determine the rate of removal of a product inside an enclosure.
Figure 10:
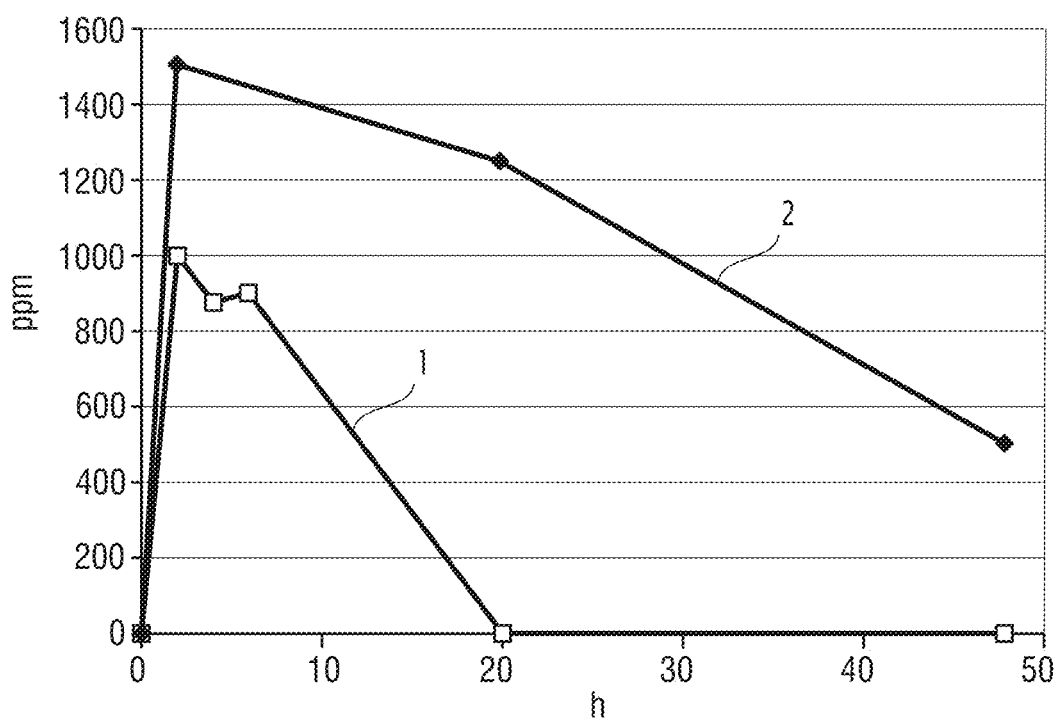

Typically, this step is performed experimentally, by making measurements of the type shown in FIGS. 9 and 10.

In the example shown in FIG. 9, an amount of a pure alcohol is evaporated and injected into an enclosure, which is a desiccator in this case. The desiccator has a volume of 9 liters, and is maintained at a temperature of 7° C. The amount of alcohol injected is 0.01 ml. Curve 1 corresponds to a first test, in which the desiccator contains 1 kg of vegetable product. In this figure, the time expressed in hours is on the abscissa, and the concentration of gaseous alcohol, expressed in ppm, is on the ordinate.

Curve 2 corresponds to a test where the desiccator is empty, and does not contain any vegetable product. It is done under the same conditions as the test corresponding to curve 1.

Curve 1 shows that at the end of the evaporation phase, the concentration of gaseous alcohol is slightly greater than 300 ppm. The evaporation phase lasts about two hours. Then, in a second phase, the concentration of gaseous alcohol rapidly decreases to about 100 ppm after eight hours. In a third phase, the concentration of gaseous alcohol decreases more slowly. After fifteen hours, the amount of gaseous alcohol is less than 50 ppm. Thus, during the second phase, the elimination rate of the alcohol is of the order of 35 ppm/h.

Curve 2 shows a gaseous alcohol concentration of about 400 ppm at the end of the evaporation phase. The gaseous alcohol concentration then decreases steadily, with a lower slope than for the first curve. The slope is then about 12 ppm/h.

The difference between these two curves makes it possible, in particular, to determine the quantity of alcohol absorbed by the vegetable products as a function of time.

During the second phase of curve 1, this speed is of the order of 23 ppm/h.

FIG. 10 shows similar tests to those shown in FIG. 9. The only difference is that the amount of alcohol injected for the tests shown in FIG. 10 is ten times greater than the amount of alcohol injected for the tests shown in FIG. 9. 0.1 ml of pure alcohol is injected for the tests of FIG. 10.

The curves of FIG. 10 have substantially the same shape as the curves of FIG. 9. In curve 1, corresponding to the case where the desiccator comprises 1 kg of vegetable products, during the second phase, the speed of elimination of the gaseous alcohol is about 50 ppm per hour. The elimination rate of the gaseous alcohol for curve 2, corresponding to the case where the desiccator is empty, is about 22 ppm/h. Thus, during the second phase, vegetable products absorb about 28 ppm/h of gaseous alcohol.

At the selection step, the above results are used to choose the conditions of evaporation and liquid injection. These conditions are those listed above.

For example, these conditions may be chosen to maintain the concentration of alcohol in the internal atmosphere of the enclosure within a certain range. In the example shown in FIGS. 9 and 10, the range could be 100 ppm-1000 ppm. The chosen conditions would be to make an injection of 0.1 ml of alcohol in the desiccator every 18 hours, or an injection of 0.01 ml of alcohol in the desiccator every 8 hours.

Alternatively, the evaporation and injection conditions may be selected to maintain the rate of absorption of the, or each, product in the vegetable products, within a predetermined range.

This may be done by first determining a representative quantity of the rate of absorption of the, or each, product in the vegetable products, then choosing the evaporation and injection conditions as a function of the representative quantity thus determined.

In the examples shown in FIGS. 9 and 10, it is possible to maintain a rate of absorption in vegetable products between 20 and 30 ppm/h by performing an injection of 0.01 ml of alcohol every 8 hours, or by an injection of 0.1 ml of alcohol every 18 hours.

Several embodiments of the treatment method will now be described.

According to one embodiment, the treatment method is a disinfection method. The product is a biocidal product, chosen as indicated above.

Figure 6:
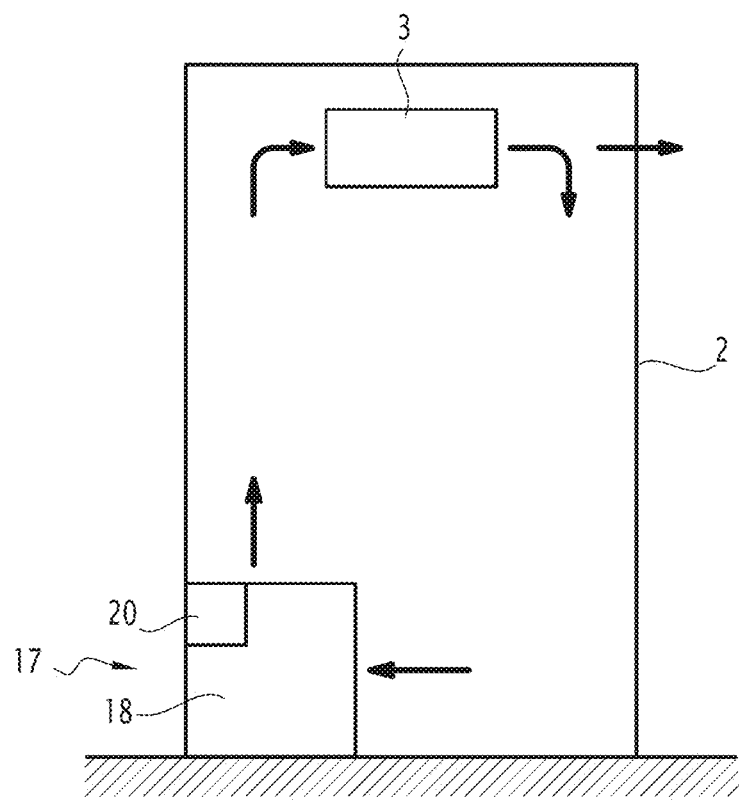
FIG. 6 shows a simplified schematic illustration of a unit comprising a room to be sanitized and a treatment device according to the invention.

As shown in FIG. 6, in this embodiment, the liquid is vaporized and injected inside an enclosure 2, which may be a chamber belonging, for example, to a school, hospital or industrial building. The enclosure 2 is, for example, equipped with an air treatment system 3, such as a heating/air conditioning system for maintaining the temperature of the internal volume of the enclosure 2 within a predetermined temperature range.

In this case, the treatment step is of a duration typically of between 3 days and 1 month, preferably between 3 days and 10 days.

In an exemplary embodiment, the treatment period is one week, with one evaporation and injection operation per day. The daily dose injected is 0.5 ml/m$^3$ of mint oil or clove oil.

According to a second embodiment illustrated in FIG. 7, the treatment method is a safener treatment method. It is, in this case, intended to deposit a product that is a safener product, on vegetable products.

The safener product is chosen as indicated above.

The enclosure is a premises, for example a chamber or a silo or a room 4 for storing vegetable products.

The enclosure 4 comprises an air treatment system 5, that is intended to maintain the temperature of the internal volume of the enclosure 4 within a predetermined range. Typically, this temperature is between 0° C. and 10° C.

Vegetable products 6 are typically fruits or vegetables.

For example, vegetable products are fruits such as apples, pears, grapes, pomegranates, etc.

In another example, the vegetable products are vegetables such as potatoes or broccoli for example.

The vegetable products 6 are in direct contact with the air filling the enclosure 4. The vaporized liquid is injected directly into the internal volume of the enclosure 4.

The method therefore comprises a step of storing vegetable products in the enclosure 4, during a storage period DS of between 3 days and one year. The processing step is concomitant with the storage step, as illustrated in FIGS. 2 to 5.

The storage duration DS and the treatment period DT are as described above.

According to a first variant embodiment, the storage duration DS is short, between 3 days and 1 month. This case corresponds to the safener treatment of wheat in silos, citrus fruits, stone fruits such as peaches. The duration DT of the treatment step is typically between 3 days and 1 month. The method comprises a single injection phase lasting between 3 days and 1 month, typically with one injection per day.

According to a second variant embodiment, the storage duration DS is long, typically between 3 months and 1 year. This case, for example, corresponds to the safener treatment of potatoes for long-term storage. The treatment period DT is substantially equal to the storage duration DS.

According to a first approach, the method comprises a single injection phase of duration PI substantially equal to the duration of treatment, typically with one injection per day.

According to a second approach, the method comprises several injection phases separated by stop phases without injection (as shown in FIG. 5).

The respective durations PI and PA of the injection and stop phases are for example:
- 3 days of injection with one injection per day, followed by 27 days without injection;
- 7 days of injection with one injection per day, followed by 23 days without injection;
- 10 days of injection with one injection per day, followed by 20 days without injection.

The number of days of injection is determined according to the total amount of product to be injected, as well as the number of days of contact and the threshold dose to have the desired activity.

For example, for the injection of 1 liter of 2-ethylhexanol on potatoes stored for 6 months, it is possible:
- to inject 5.5 ml/tonne of potatoes daily;
- to inject 55 ml/tonne on 3 days per month;
- to inject 24 ml/tonne on 7 days a month.

The preferred solution corresponds to the injection of low daily doses.

According to a first exemplary embodiment, potatoes are stored in the enclosure 4, at a temperature of about 7° C. to 9° C.

In the treatment step, a liquid comprising at least 50% by weight of L-carvone is evaporated and injected into the enclosure 4. Typically, this liquid is spearmint oil. In this case, the treatment duration is substantially equal to the storage duration. The treatment step comprises a single injection phase, of a duration that is substantially equal to the treatment duration. An injection operation is carried out each day, wherein the quantity of liquid injected is between 1 and 10 ml of liquid per tonne of potatoes, preferably between 1 and 5 ml per tonne of potatoes, and, for example 2 ml per tonne of potatoes.

According to a second exemplary embodiment, potatoes are stored in the enclosure 4 at a temperature of about 7° C. to 9° C.

In the treatment step, a liquid comprising a C3-C9 alcohol is evaporated and injected into the enclosure 4. Typically, this liquid is 2-ethylhexanol. In this case, the treatment time is about 6 months. The treatment step comprises a single injection phase, of a duration that is substantially equal to the treatment duration. One injection operation is carried out each day, wherein the total quantity of liquid injected during the 6 months is between 100 and 2000 ml of liquid per tonne of potatoes, preferably between 600 and 1200 ml per tonne of potatoes, and, for example, 1000 ml per tonne of potatoes.

According to a third exemplary embodiment, potatoes may be stored in the enclosure 4, at a temperature of about 7° C. to 9° C.

In the treatment step, a liquid comprising a C3-C9 alcohol is evaporated and injected into the enclosure 4. Typically, this liquid is 2-ethylhexanol. In this case, the treatment time is about 6 months. The treatment step comprises several injection phases, separated by stop phases without injection. Each injection phase lasts between 3 days and 2 weeks, typically one week. The duration of each stop phase is approximately 3 weeks. During each injection phase, an injection operation is performed every day, wherein the quantity of liquid injected is between 5.5 and 110 ml/day ml of liquid per tonne of potatoes, preferably between 33 and 67 ml/day per tonne of potatoes, for example 55 ml/day per tonne of potatoes.

According to a fourth embodiment, citrus fruits receive a fungicidal treatment with clove oil for protection during the ripening phase, during which phase the color change of the fruit takes place at a relatively high temperature and humidity. This phase comes just before the fruit is packed. The treatment involves an injection phase of 4 g/tonne per day for 5 days. The storage time is short, from 3 days to 1 month.

A third embodiment not covered by the invention will now be described with reference to FIG. 8.

Only the points by which this third embodiment differs from the second embodiment will be detailed below. The identical elements or those providing the same functions in the two embodiments will be designated by the same references.

In this third embodiment, the enclosure is a package 12, and not a silo or a cold chamber. This package is for example a bag, or a box, or a crate as shown in FIG. 8.

The liquid 14 containing the, or each, product is placed in a closed container 16, provided with at least one wall of a material that is permeable to one or more of the products. The container 16 is placed in the package 12.

Advantageously, a porous solid material 17 such as pumice is placed in the container 16, wherein the liquid soaks the solid material.

The container 16 is, for example, a bag or a box.

In this third embodiment, the liquid is evaporated and diffused inside the package 12 in a continuous manner. The injection is made through the permeable material. The liquid evaporates inside the container, wherein the evaporated liquid diffuses through the wall of permeable material.

By "permeable" is meant here that the wall is permeable to the, or each, typically permeable to liquid vapor.

In the example shown in FIG. 8, the package contains vegetable products 6. The product is then a safener product.

Alternatively, the liquid may be a biocidal product, whose purpose is to maintain the interior of the package in a satisfactory sanitary condition.

The amount of product injected may be controlled by appropriately selecting, as a function of the nature of the liquid and the product, the material constituting the permeable wall of the closed container 16, its area, its thickness and the volume of liquid contained in the container 16. For example, the material of the permeable wall may be polyethylene, while the safener product is mint oil, and the vegetable product is the potato.

Potatoes of the Nicolas variety harvested on Dec. 5, 2015 are stored in experimental storage cells of 200 liters each containing 15 kg of potatoes.

Polyethylene sachets containing 4 g of mint oil absorbed on hydroplethobic sand are prepared.

Several cells are prepared to evaluate the effectiveness of this method of anti-germinal treatment:
1) A control cell containing only potatoes.
2) A cell containing 1 sachet.
3) A cell containing 2 sachets.
4) A cell containing 4 sachets.
5) A cell containing 6 sachets.

After 20 days of storage at room temperature, 30° C. during the day and 20° C. at night, the potatoes of each cell are studied:

% of germs observed after 20 days of storage:
1) 100%
2) 80%
3) 3-4%
4) 0%
5) 0%

A treatment device 17 will now be described. This device is provided for the implementation of the method described above.

Conversely, the method described above is intended to be implemented by the treatment device which will now be described.

The treatment device 17 comprises:
- a vaporizer 18 that is designed to evaporate a liquid containing the, or each, product at a temperature below 50° C., and to inject the evaporated liquid inside an enclosure, wherein the enclosure may be a room;
- an electronic device 20 for controlling the vaporizer.

As indicated above, for disinfection applications, the enclosure is for example a room belonging to a hospital, a school, an industrial facility, or any other building. The enclosure may also be a tank, a storage or transport tank, or any other type of enclosure to be disinfected.

For safener applications, the enclosure may be a cold room, a silo for the storage of vegetable products, or any other type of enclosure intended for the storage of vegetable products such as fruits or vegetables.

The product is of the type described above with respect to the treatment method.

The vaporizer 18 is typically a vaporizer of the type described in WO 2014/001201. This vaporizer is particularly suitable for evaporation at room temperature of relatively heavy liquids, such as essential oils.

Figure 11:
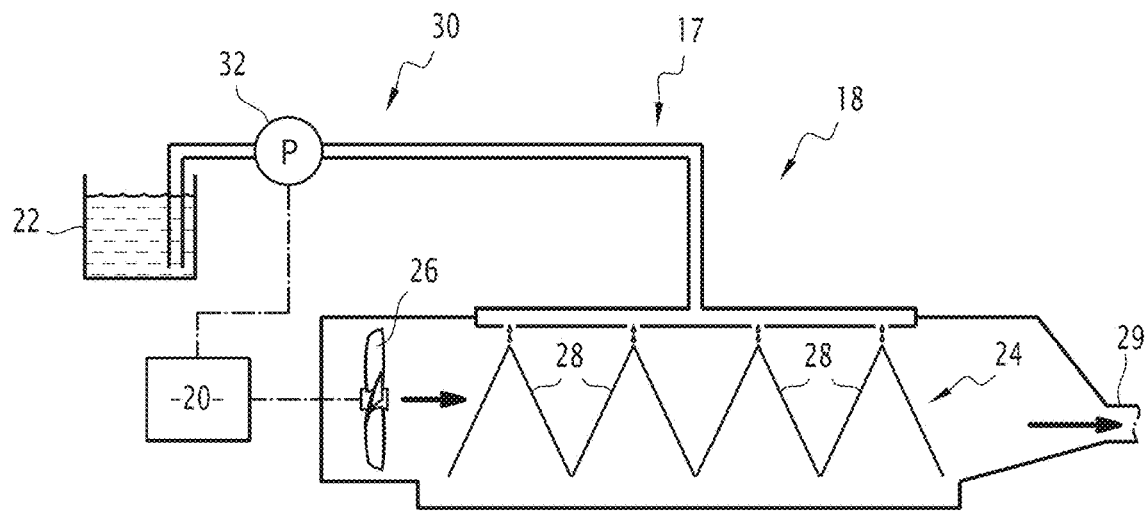
FIG. 11 shows a schematic representation of a processing device provided for implementing the method of the invention.

The vaporizer 18 typically comprises, as shown in FIG. 11,
- a reservoir 22 containing the liquid;
- a member 24 for absorbing the liquid;
- a member 26 for producing a flow of gas, wherein the flow of gas is directed towards the absorption member 24.

The absorption member 24 comprises a plurality of absorbent strips 28, that are designed to retain the liquid. The absorbent strips are, for example, arranged vertically, or are inclined with respect to the vertical with an inclination allowing the liquid to flow by gravity from the upper end of the strip towards the lower end. The strips are, for example, arranged in a V, wherein the tip of the V points upwards. They may be arranged in a W or accordion configuration.

The absorbent strips 28 are typically made of microfibers.

The member 26 for producing a gas flow is, for example, a fan, oriented in order to create an air flow towards the absorbent strips 28.

The air flow loaded with vaporized liquid is channeled through a duct 29 opening into the internal atmosphere of the enclosure. Alternatively, the liquid absorbing member 24 and the gas flow producing member 26 may be placed directly inside the enclosure, wherein the member 26 sets in motion the internal atmosphere of the enclosure (FIGS. 6 and 7).

Advantageously, the vaporizer 18 comprises a member 30 for injecting the liquid into the absorption member 24 from the reservoir 22. This injection member 30 comprises a dosing member 32, for example a dosing pump. This dosing member 32 controls the flow of liquid injected into the absorbent strips 28. The liquid is injected at the upper end of each strip, and flows by gravity to the lower end of each strip.

Preferably, the vaporizer 18 is so designed that all the injected liquid is evaporated before reaching the lower end of each strip 28 in order to perfectly control the flow of evaporated liquid. This result is obtained by appropriately choosing, as a function of the nature of the liquid, the area of the strips, the flow of liquid injected into each strip, and the gas flow rate.

Such a vaporizer is sold by XEDA INTERNATIONAL under the name XEDAVAP®.

Alternatively, the vaporizer may be different. The vaporizer may comprise, for example, a vessel containing the liquid, and a member for producing a flow of gas directed towards the free surface of the liquid.

Alternatively, the vaporizer may comprise a vessel containing the liquid and a device for bubbling gas through the liquid. The gas, after passing through the liquid and being charged with steam, is mixed with another flow of gas which drags the gas to the inside of the enclosure.

The vaporizer may be of any other type, as a function of the liquid to be evaporated.

The electronic device 20 may be, for example, a computer or a computer part. Alternatively, the electronic control device 20 may be implemented in the form of a Field Programmable Gate Array (FPGA) or in the form of an Application Specific Integrated Circuit (ASIC).

The electronic control device 20 is programmed to implement the method of the invention described above.

Thus, it is programmed to implement a treatment step lasting longer than or equal to 3 days, wherein this treatment step comprises at least one injection phase of a duration greater than or equal to 3 days during which period, the vaporizer evaporates the liquid and injects the vaporized liquid with a period of less than or equal to 2 days.

The duration of the treatment step is preferably greater than or equal to 5 days, more preferably greater than or equal to 7 days.

The duration of the, or each, injection phase is preferably greater than or equal to 5 days, more preferably greater than or equal to 7 days.

For disinfection applications, the duration of treatment is as described above.

For safener applications, the duration of treatment DT is a function of the storage duration DS of the vegetable products inside the enclosure. The invention is particularly suitable for cases where the vegetable products are stored for a storage period of between 3 days and 1 year.

In terms of storage time, there are two different cases:
Case of short storage period: from 3 days to 1 month, for example wheat stored in silos before bagging, stone fruits (peaches, nectarines . . . ), oranges stored in a maturation chamber before their packaging. In this case the treatment will last at least 3 days.

Case of long storage period: from 3 months to 1 year, with a duration of treatment also between 3 months and 1 year. The electronic device is then programmed so that the treatment duration is greater than or equal to 50% of the storage duration, preferably greater than 75%, more preferably greater than 90% of the storage time.

Thus, a treatment is carried out which extends practically over the entire storage period, guaranteeing excellent control of the development of the vegetable products.

In all cases, according to a first embodiment, corresponding to FIGS. 1 to 4, the electronic device 30 may be programmed so that the treatment step comprises a single injection phase. The duration of the injection phase is substantially equal to the duration of the treatment step. Alternatively, the duration of the injection phase may be shorter than that of the treatment step, for example because the last injection operation was performed slightly before the end of the treatment step.

According to a second embodiment, the electronic device is programmed so that the treatment step comprises a plurality of successive injection phases, separated from each other by stop phases without injection (FIG. 5).

The duration of each injection phase and of each stop phase is as described above with respect to the treatment method.

Furthermore, according to a first variant embodiment, the electronic device is so programmed that during each injection phase, several evaporation and liquid injection operations may be carried out, typically with a regular interval, i.e. with a regular period between injections. This is shown in FIGS. 1, 2, 4 and 5. The period between two injections is, as indicated above, less than 2 days, and is, for example, one day. In other words, for example, one liquid injection operation may be performed per day.

According to another variant embodiment, the electronic device may be programmed to evaporate and inject the liquid continuously, i.e. without any interruption during the entire injection phase.

The electronic device 20 may be programmed so that, during the, or each, injection phase, the liquid may be evaporated and injected under conditions chosen in order to maintain a concentration of the, or each, product in the internal atmosphere of the enclosure within a predetermined concentration range.

The concentration range may be determined using curves such as those shown in FIGS. 9 and 10, as described above with respect to the method of the invention.

The evaporation and injection conditions typically include one or more of the following parameters:
number of injection phases;
duration of each injection phase;
number of injection operations in each injection phase;
period between two injection operations,
quantity of products injected at each injection operation;
possibly the duration of the stop period between two injection periods;
etc.

Alternatively, the electronic device 20 may be programmed so that, during the, or each, injection phase, the liquid may be evaporated and injected under conditions chosen in order to maintain the rate of absorption of the vegetable protection product by the vegetable products within a predetermined range.

This range is determined, for example, using curves similar to those of FIGS. 9 and 10, as described above.

The conditions comprise the same parameters as those described above.

Figure 12:
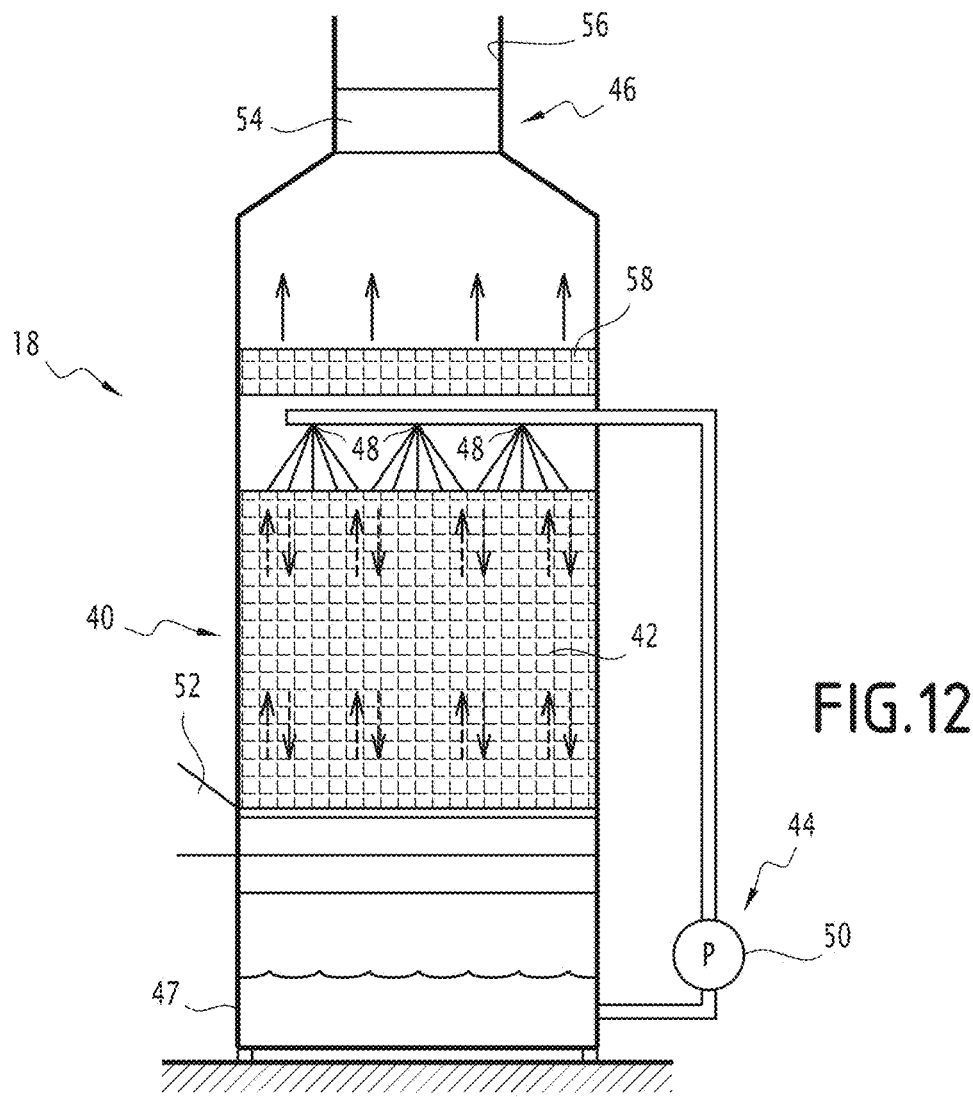
FIG. 12 shows a schematic representation of a vaporizer designed to evaporate high liquid flow rates.

According to an alternative embodiment shown in FIG. 12, the vaporizer 18 comprises a tower 40 with packing 42, a device 44 for injecting the liquid above the packing 42, and a device 46 arranged to create an air flow ascending through the packing 42.

The tower 40 typically comprises a tank 47, placed under the packing 42, and containing the liquid.

The device 44 for injecting the liquid above the packing typically comprises one or more spray bars 48 placed above the packing 42, and a liquid transfer member 50, such as a pump, sucking the liquid in the tank 47 and driving it back into the spray bars 48.

The device 46 for creating the air flow comprises one or more air inlets 52 opening inside the tower under the packing 42, and an air circulation member 54, placed above the packing. The member 54 is, for example, a fan or a blower.

Each inlet 52 communicates fluidly with the internal atmosphere of the enclosure 4.

The tower 40 has an outlet 56 for the air charged with evaporated liquid, placed in the upper part, above the packing 42. The outlet 56 is fluidly connected with the internal atmosphere of the enclosure 4. The member 54 sucks the evaporated liquid-laden air over the packing 42 and discharges it into, or toward, the outlet 56.

The packing 42 is, for example, a honeycomb packing.

The vaporizer further comprises a droplet separator 58 placed above the spray bars 48.

In an exemplary embodiment, the tower 40 has a vertical axis, and has a substantially constant horizontal section of 700×700 mm. The tank 47 has the same horizontal section as the tower, and has a height of between 500 and 700 mm.

The vaporizer has, for example, four inlets 52, each arranged on one side of the tower.

The packing 42 has a height of about 1 meter.

The packing 42 is placed, for example, 700 mm below the liquid inlet, wherein the droplet separator 58 is placed 300 mm above the liquid inlet.

The operation of the vaporizer 18 is as follows.

The liquid 46 to be evaporated is placed in the tank 47. The pump 50 delivers the liquid into the spray bars 48, which spray the liquid towards the packing 42. The air circulation member 54 creates a rising air flow. The air enters the tower 40 through the inlets 52, and flows upwards through the packing 42. The liquid flows downwards through the packing 42, wherein a portion of the liquid is evaporated upon contact with the air flow and is driven by the air flow in the form of vapor. The fraction of the liquid that is not evaporated falls back into the tank 47 and is recycled. The air charged with evaporated liquid passes through the droplet separator 58 and is discharged by the member 54 to the outlet 56.

The vaporizer 18 is typically placed inside the enclosure 4. It sucks the internal atmosphere directly through the inlet(s) 52, and discharges the vapor-laden air directly into the internal atmosphere via the outlet 56.

A method using such a vaporizer, i.e. in which the liquid is evaporated by contact with an air flow in a packed tower, allows the evaporation of a large amount of liquid, much higher than that it is possible to evaporate in a vaporizer of the XEDAVAP® type.

For example, in the vaporizer shown in FIG. 11, with absorbent strips having a surface area of 4 m2, it is possible to evaporate about 1.2 liters per day of mint oil. With the packed tower of FIG. 12, it is possible to evaporate an amount much greater than 1.2 liters per day up to 20 liters per day.

This vaporizer has the advantage of being extremely simple, having a very high evaporation capacity, and having a relatively modest size.

Due to its high evaporation capacity, it is possible to maintain the internal atmosphere of the enclosure to a product concentration close to saturation. This allows the product to best perform its action.

Alternatively, any other type of suitable vaporizer may be used to maintain the internal atmosphere of the enclosure at a product concentration close to saturation.

The vaporizer may be controlled by the electronic device 20 in different ways.

According to a first variant, the vaporizer may operate continuously. It is placed in the internal atmosphere of the enclosure. It sucks and expels the air charged with vapor. Once the internal atmosphere is saturated with product, it is no longer possible to increase the vapor concentration, and the evaporation stops naturally.

Alternatively, the electronic device 20 may be programmed to start and stop the evaporator according to a predetermined time chart.

According to yet another variant, the electronic device 20 may be connected to an analyzer continuously measuring the concentration of the product vapor in the internal atmosphere of the enclosure. It starts, stops or modulates the operation of the vaporizer 18 in order to maintain the concentration within a predetermined range.

According to yet another variant embodiment, the processing device may comprise a camera arranged to observe the vegetable products stored in the enclosure. The camera is connected to a control station located at a distance from the enclosure. This control station may comprise a screen allowing an operator to see images taken by the camera, and thus know the status of the stored vegetable products. Furthermore, the control station is designed to control the electronic control device 20, which allows the operator to adapt the control of the vaporizer, typically to change the dose of product applied to vegetable products per unit of time.

According to another aspect, the invention relates to a unit comprising the enclosure 2, 4 and a treatment device 17 having the above characteristics. In this case, the vaporizer 18 is designed to inject the vapors of the liquid into the enclosure 2, 4.

According to an embodiment, the assembly may comprise vegetable products stored in the enclosure 4.

The vegetable products 6 are typically exposed to the internal atmosphere of the enclosure 4, as shown in FIG. 7, in the sense that they are not packaged in a container.

According to yet another aspect not covered by the invention, the unit may comprise:
- a closed package 12 such as a bag or a box;
- vegetable products 6 stored in the package 12;
- a liquid 14 containing at least one safener product;
- a closed container 16 provided with at least one wall of a material that is permeable to the, or each, vegetable protection product, wherein the liquid 14 is enclosed in the container 16.

This embodiment is shown in FIG. 8.

The container 16 is placed in the package 12.

The liquid 14 and the container 16 are chosen so that, at a temperature below 50° C., the liquid containing the, or each, safener product is vaporized and injected inside the package 12 continuously during a phase of injection lasting more than six days.

The liquid soaks porous solids 17 disposed in the container 16.

The container 16 is of the type described above with reference to the treatment process.

The liquid 14 is one of the liquids described above. Preferably, the liquid is a liquid that is easy to evaporate at low temperature, for example an alcohol.

To obtain the desired performance, the surface of the permeable material wall, the thickness of this wall, and the nature of the material are typically chosen as a function of the nature of the liquid and the crop protection product.

For example, the material may be polyethylene.

What is claimed is:

1. A method of treatment of vegetable or fruit products with at least one safener product with a boiling temperature between 60 and 280° C., the method comprising:
   storing the vegetable or fruit products in a closed room during a storage duration between 3 months and 1 year; and
   while the vegetable or fruit products are stored in the closed room, treating the vegetable or fruit products with the at least one safener product during a treatment duration that is between 50% of the storage duration and 100% of the storage duration,
   wherein treating comprises performing evaporation and introduction operations of the at least one safener product,
   wherein the treatment duration comprises a plurality of active treatment periods, the evaporation and introduction operations being carried out during each of the plurality of active treatment periods, two successive active treatment periods among the plurality of active treatment periods being separated by a stop period with no evaporation and introduction operations,
   wherein during the plurality of active treatment periods, the evaporation and introduction operations are carried out continuously or repeatedly, two evaporation and introduction operations being spaced apart by a period less than two days,
   wherein during each evaporation and introduction operation, a liquid containing the at least one safener product is evaporated at a temperature below 50° C. and the evaporated liquid is introduced into the closed room while the vegetable or fruit products are stored in the closed room;
   wherein each active treatment period has a period between 3 days and 15 days.

2. The method according to claim 1, wherein the method further comprises determining a representative quantity of a rate of elimination of the at least one safener product inside the closed room, and selecting liquid evaporation and evaporated liquid introduction conditions according to the determined representative quantity.

3. The method according to claim 1, wherein, during at least one or each of the plurality of active treatment periods, the liquid is evaporated and the evaporated liquid is introduced under conditions chosen in order to maintain a concentration of the at least one safener product in an internal atmosphere of the closed room within a concentration range predetermined for each use, wherein this concentration is between 50 and 2000 ppm.

4. The method according to claim 1, wherein the at least one safener product is chosen from the group consisting of:

essential oil; terpenes; saturated or unsaturated C3-C9 short chain alcohol; and volatile synthetic products.

5. The method according to claim 1, wherein the liquid is evaporated by contact with a flow of air in a packed tower.

6. The method according to claim 1, wherein the evaporation is carried out with a vaporizer operating continuously.

7. The method according to claim 1, wherein each stop period has a duration between 15 days and two months.

8. A method of treatment of fruit products of citrus fruits or stone fruits, the method comprising:
   storing the fruit products in a closed room during a storage duration between 3 days and 1 month; and
   while the fruit products are stored in the closed room, treating the fruit products with at least one safener product during a treatment duration between 3 days and 1 month, the at least one safener product having a boiling temperature between 60 and 280° C.,
   wherein treating comprises carrying out evaporation and introduction operations continuously or repeatedly, two evaporation and introduction operations being spaced apart by a period of less than two days,
   wherein, during each evaporation and introduction operation, a liquid containing the at least one safener product is evaporated at a temperature below 50° C. and the evaporated liquid is introduced into the closed room while the fruit products are stored in the closed room.

9. The method according to claim 8, wherein the at least one safener product is chosen from the group consisting of essential oil; terpenes; saturated or unsaturated C3-C9 short chain alcohol; and volatile synthetic products.

10. The method according to claim 8, wherein the liquid is evaporated and the evaporated liquid is introduced under conditions chosen in order to maintain a concentration of the at least one safener product in an internal atmosphere of the closed room within a concentration range predetermined for each use, wherein the concentration is between 50 and 2000 ppm.

11. The method according to claim 8, wherein the liquid is evaporated by contact with a flow of air in a packed tower.

12. A method of treatment of vegetable or fruit products, the method comprising:
   storing the vegetable or fruit products in a closed room during a storage duration between 3 months and 1 year; and
   while the vegetable or fruit products are stored in the closed room, treating the vegetable or fruit products with at least one safener product during a treatment duration that is between 50% of the storage duration and 100% of the storage duration, the at least one safener product having a boiling temperature between 60 and 280° C.,
   wherein treating comprises carrying out evaporation and introduction operations continuously or repeatedly, two evaporation and introduction operations being spaced apart by a period of less than two days,
   wherein, during each evaporation and introduction operation, a liquid containing the at least one safener product is evaporated at a temperature below 50° C. and the evaporated liquid is introduced into the closed room while the vegetable or fruit products are stored in the closed room.

13. The method according to claim 12, wherein the at least one safener product is chosen from the group consisting of essential oil; terpenes; saturated or unsaturated C3-C9 short chain alcohol; and volatile synthetic products.

14. The method according to claim 12, wherein the liquid is evaporated and the evaporated liquid is introduced under conditions chosen in order to maintain a concentration of the at least one safener product in an internal atmosphere of the closed room within a concentration range predetermined for each use, wherein the concentration is between 50 and 2000 ppm.

15. The method according to claim 12, wherein the liquid is evaporated by contact with a flow of air in a packed tower.

* * * * *